(12) United States Patent
Hu et al.

(10) Patent No.: US 10,942,640 B2
(45) Date of Patent: Mar. 9, 2021

(54) FINGERPRINT RECOGNITION MODULE AND MOBILE PHONE

(71) Applicant: HuiZhou TCL Mobile Communication Co., Ltd., HuiZhou (CN)

(72) Inventors: Zhiguo Hu, HuiZhou (CN); Hongbin Zhan, HuiZhou (CN); Weihui Fan, HuiZhou (CN); Yun Ye, HuiZhou (CN); Rui Shi, HuiZhou (CN); Yun Lin, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 7 days.

(21) Appl. No.: 16/463,408

(22) PCT Filed: Oct. 31, 2017

(86) PCT No.: PCT/CN2017/108698
§ 371 (c)(1),
(2) Date: May 23, 2019

(87) PCT Pub. No.: WO2018/095203
PCT Pub. Date: May 31, 2018

(65) Prior Publication Data
US 2020/0133456 A1    Apr. 30, 2020

(30) Foreign Application Priority Data

Nov. 24, 2016   (CN) .......................... 2016 1 1045374

(51) Int. Cl.
*G06F 3/0488*   (2013.01)
*G06K 9/00*    (2006.01)
*H04M 1/02*    (2006.01)

(52) U.S. Cl.
CPC ....... *G06F 3/0488* (2013.01); *G06K 9/00006* (2013.01); *H04M 1/026* (2013.01); *H04M 1/0279* (2013.01)

(58) Field of Classification Search
CPC .................. G06K 9/00053; G06K 9/00892; G06F 21/32; G06F 1/1643; G06F 2203/0338; G06F 3/044; G06F 3/0488; H04L 63/0861
See application file for complete search history.

(56) References Cited

U.S. PATENT DOCUMENTS

| | | | |
|---|---|---|---|
| 9,119,311 | B2 | 8/2015 | Yamanaka et al. |
| 2013/0176666 | A1 | 7/2013 | Yamanaka et al. |

(Continued)

FOREIGN PATENT DOCUMENTS

| | | |
|---|---|---|
| CN | 201213271 | 3/2009 |
| CN | 105704267 | 6/2016 |
| CN | 106412164 | 2/2017 |

OTHER PUBLICATIONS

International Search Report and the Written Opinion dated Jan. 4, 2018 From the International Searching Authority Re. Application No. PCT/CN2017/108698 and Its Translation of Search Report Into English. (9 Pages).

*Primary Examiner* — Gerald Johnson

(57) ABSTRACT

Disclosed by the present invention are a fingerprint recognition module and a mobile phone, the mobile phone comprising a fingerprint recognition module, a display screen, a touch screen chip disposed on the display screen and a touch screen panel disposed on the touch screen chip, a display touch integrated circuit (IC) and a display screen touch circuit board being disposed at one end of the display screen. The present invention reduces the length of a bottom frame of a mobile phone as well as the entire mobile phone by means of silk printing, transfer printing or electroplating a decorative ring on the touch screen panel to take the place (Continued)

of the fingerprint recognition metal decorative ring of an ordinary mobile phone.

20 Claims, 3 Drawing Sheets

(56) References Cited

U.S. PATENT DOCUMENTS

| | | | |
|---|---|---|---|
| 2013/0341398 A1* | 12/2013 | Rao | G06K 9/0002 |
| | | | 235/439 |
| 2014/0140588 A1* | 5/2014 | Chou | G06K 9/0002 |
| | | | 382/124 |
| 2016/0091930 A1* | 3/2016 | Chen | G06F 3/041 |
| | | | 345/173 |
| 2017/0243046 A1* | 8/2017 | Chang | H01L 23/10 |
| 2018/0052554 A1* | 2/2018 | Zhang | H04M 1/0277 |
| 2018/0052561 A1* | 2/2018 | Wu | G06K 9/00013 |
| 2018/0081480 A1* | 3/2018 | Ran | G06F 3/044 |
| 2018/0330221 A1* | 11/2018 | Fischer | B42D 25/45 |

* cited by examiner

FINGERPRINT RECOGNITION MODULE AND MOBILE PHONE

RELATED APPLICATIONS

This application in a National Phase of PCT Patent Application No. PCT/CN2017/108698 having International filing date of Oct. 31, 2017, which claims the benefit of priority of Chinese Patent Application No. 201611045374.0 filed on Nov. 24, 2016. The contents of the above applications are all incorporated by reference as if fully set forth herein in their entirety.

FIELD AND BACKGROUND OF THE INVENTION

The present disclosure relates to the field of mobile terminal technology, more particularly, to a fingerprint identification module and a mobile phone.

With the development of science and technology and improvement of people's standard of living, mobile phones have become an indispensable daily necessity for people's lives. No matter whether they work at home or travel on business, all aspects of life are inseparable from mobile phones.

Today, with the rapid development of society, not only do people focus on the performance of mobile phones, but they also have increasingly higher demands for the appearance of mobile phones. For example, the pursuit of narrow bezel makes the width of the entire mobile phone smaller, and the screen ratio becomes increasingly higher. The mobile phone becomes more and more beautiful, however, the length of the entire mobile phone is limited by the stack and thus is difficult to be reduced.

At present, the fingerprint identification module of the mobile phone with fingerprint recognition features is designed to add a metal ring, which not only protects the IC but also provides a decorative effect. However, the addition of the metal ring increases the volume of the fingerprint module to cause both the width and thickness of the bezel of the mobile phone to be significantly increased. It is disadvantageous to the development of the narrow bezel mobile phone, and the equipped metal ring also increases the cost of the entire mobile phone.

Therefore, there is a need to resolve the above problems of the related art.

SUMMARY OF THE INVENTION

The present disclosure provides a fingerprint identification module and a mobile phone that can resolve the problem of increase of a width of an entire mobile phone, and more particularly, of a bezel of a mobile phone due to the existence of the metal ring in the related art.

The present disclosure provides a fingerprint identification mobile phone. The fingerprint identification mobile phone comprises a display screen, a touch screen chip disposed on the display screen and configured to sense an external touch signal, and a touch screen panel disposed on the touch screen chip and configured to protect the touch screen chip. A display screen touch IC and a display screen touch circuit board are disposed at one end of the display screen. A reserved hole for a fingerprint identification module is formed in the touch screen panel. A fingerprint identification decorative ring is further disposed on the touch screen panel. The fingerprint identification decorative ring is formed around the reserved hole for the fingerprint identification module in the touch screen panel. The fingerprint identification mobile phone further comprises the fingerprint identification module.

The fingerprint identification module comprises a fingerprint identification module chip configured to sense fingerprint information, and a fingerprint identification module circuit board disposed under the fingerprint identification module chip and configured to connect a fingerprint identification module circuit. The fingerprint identification module chip is disposed in the reserved hole for the fingerprint identification module. A shape of the fingerprint identification module chip corresponds to a shape of the reserved hole for the fingerprint identification module, and a width of the fingerprint identification module chip is smaller than a width of the reserved hole for the fingerprint identification module. A thickness of the fingerprint identification module chip is smaller than a thickness of the touch screen panel.

Preferably, the fingerprint identification decorative ring is formed around the reserved hole for the fingerprint identification module in the touch screen panel, and is formed by screen printing on the touch screen panel.

Preferably, the fingerprint identification decorative ring is formed around the reserved hole for the fingerprint identification module in the touch screen panel, and is formed by transferring on the touch screen panel.

Preferably, the fingerprint identification decorative ring is formed around the reserved hole for the fingerprint identification module in the touch screen panel, and is formed by electroplating on the touch screen panel.

Preferably, the fingerprint identification decorative ring is formed around the reserved hole for the fingerprint identification module in the touch screen panel, and is formed by etching on the touch screen panel.

Preferably, the fingerprint identification decorative ring is formed around the reserved hole for the fingerprint identification module in the touch screen panel, and is formed by carving on the touch screen panel.

Preferably, the fingerprint identification module further comprises a reinforcing steel sheet disposed under the fingerprint identification module circuit board and configured to enhance a strength of the fingerprint identification module.

Preferably, a position where the fingerprint identification module is disposed at corresponds to the one end of the display screen where the display screen touch IC and the display screen touch circuit board are disposed at.

Preferably, the fingerprint identification module circuit board and the reinforcing steel sheet are embedded in a gap between the touch screen panel and the display screen.

Preferably, the fingerprint identification module and the touch screen panel are bonded through glue.

Preferably, the reinforcing steel sheet and the fingerprint identification module circuit board are bonded through glue.

Preferably, the width of the fingerprint identification decorative ring is one tenth of the width of the fingerprint identification module chip.

The present disclosure further provides a fingerprint identification module. The fingerprint identification module comprises a fingerprint identification module chip configured to sense fingerprint information, and a fingerprint identification module circuit board disposed under the fingerprint identification module chip and configured to connect a fingerprint identification module circuit. The fingerprint identification module further comprises a fingerprint identification decorative ring. The fingerprint identification decorative ring is disposed around the fingerprint identification module chip.

Preferably, the fingerprint identification module further includes a reinforcing steel sheet disposed under the fingerprint identification module circuit board and configured to enhance a strength of the fingerprint identification module.

The present disclosure provides a fingerprint identification mobile phone. The fingerprint identification mobile phone comprises a display screen, a touch screen chip disposed on the display screen and configured to sense an external touch signal, and a touch screen panel disposed on the touch screen chip and configured to protect the touch screen chip. A display screen touch IC and a display screen touch circuit board are disposed at one end of the display screen. A reserved hole for a fingerprint identification module is formed in the touch screen panel. A fingerprint identification decorative ring is further disposed on the touch screen panel. The fingerprint identification decorative ring is formed around the reserved hole for the fingerprint identification module in the touch screen panel. The fingerprint identification mobile phone further comprises the fingerprint identification module. The fingerprint identification module comprises a fingerprint identification module chip configured to sense fingerprint information, and a fingerprint identification module circuit board disposed under the fingerprint identification module chip and configured to connect a fingerprint identification module circuit. The fingerprint identification module chip is disposed in the reserved hole for the fingerprint identification module.

Preferably, a position where the fingerprint identification module is disposed at corresponds to the one end of the display screen where the display screen touch IC and the display screen touch circuit board are disposed at.

Preferably, the fingerprint identification module circuit board and the reinforcing steel sheet are embedded in a gap between the touch screen panel and the display screen.

Preferably, a shape of the fingerprint identification module chip corresponding to a shape of the reserved hole for the fingerprint identification module, and a width of the fingerprint identification module chip being smaller than a width of the reserved hole for the fingerprint identification module.

Preferably, the fingerprint identification module and the touch screen panel are bonded through glue.

Preferably, a thickness of the fingerprint identification module chip being smaller than a thickness of the touch screen panel.

The present disclosure provides a fingerprint identification module and a mobile phone. The fingerprint identification decorative ring is formed by screen printing, transferring or electroplating on the touch screen panel according to the present disclosure so as to replace the fingerprint identification metal ring. As a result, the hole diameter of the hole for the fingerprint identification module in the touch screen panel can be decreased, thus realizing the narrow bezel. At the same time, not only does elimination of the metal ring significantly reduce the thickness of the fingerprint module, but the circuit board and reinforcing steel sheet of the thinned fingerprint identification module can be embedded in a gap between the touch screen panel and the display screen to reduce the length of the entire mobile phone.

BRIEF DESCRIPTION OF THE SEVERAL VIEWS OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF SPECIFIC EMBODIMENTS OF THE INVENTION

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

Figure 1:
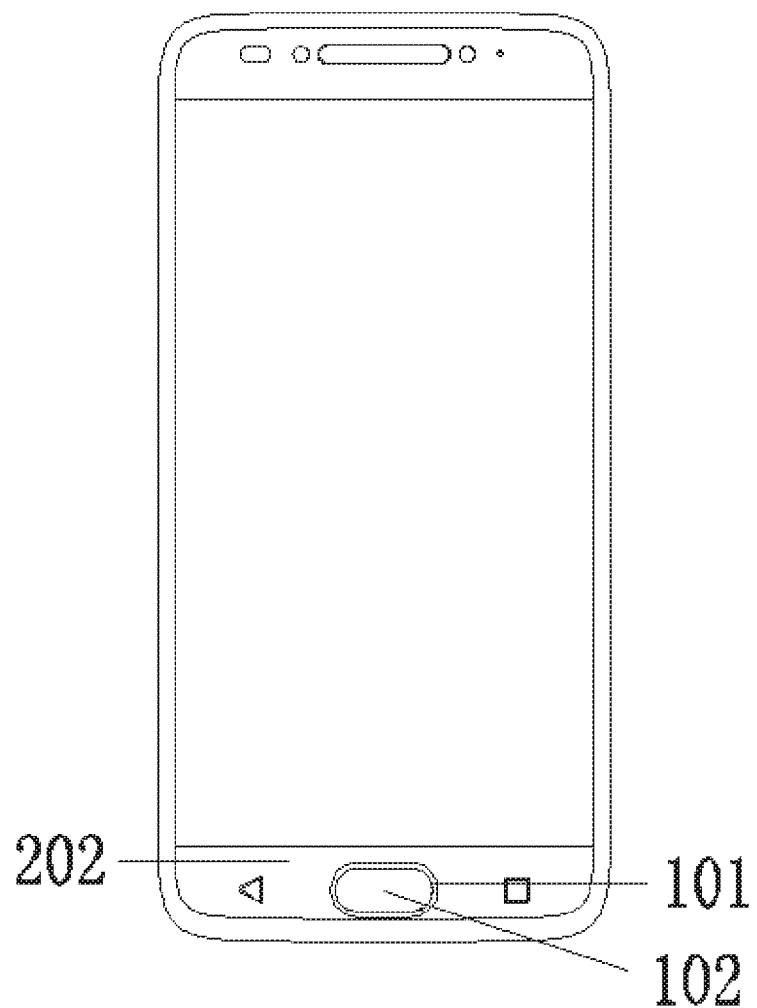
FIG. 1 is a front view of a fingerprint identification mobile phone according to one embodiment of the present disclosure.

As shown in FIG. 1, a fingerprint identification decorative ring 101 of the present disclosure is formed by screen printing, transferring or electroplating on a touch screen panel 202, and is formed around a reserved hole for a fingerprint identification module in the touch screen panel 202, so that the fingerprint identification decorative ring 101 can surround a fingerprint identification module chip 102 after the mobile phone is assembled. The visual effect of the fingerprint identification metal ring of a common fingerprint identification mobile phone is thus achieved. It can be understood that the fingerprint identification decorative ring 101 of the present disclosure is not limited to being formed by screen printing, transferring or electroplating on the touch screen panel 202, and may be formed by some other similar methods, such as etching, carving, etc. on the touch screen panel.

A shape of the fingerprint identification decorative ring 101 may be one of a circle, an ellipse, a square and a rectangle.

Figure 2A:
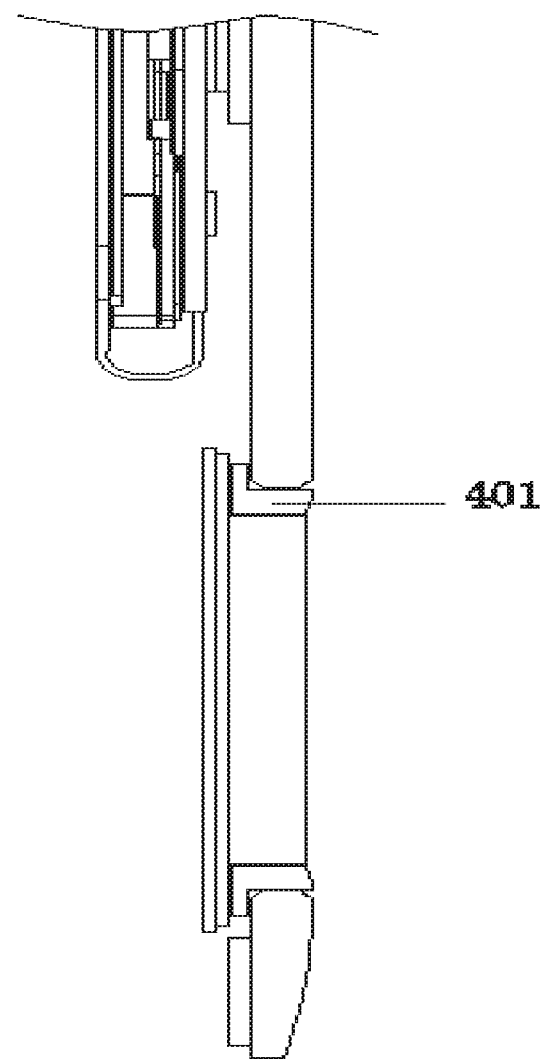
FIG. 2a is a partial side view of a common mobile phone having a fingerprint identification metal ring.
Figure 2B:
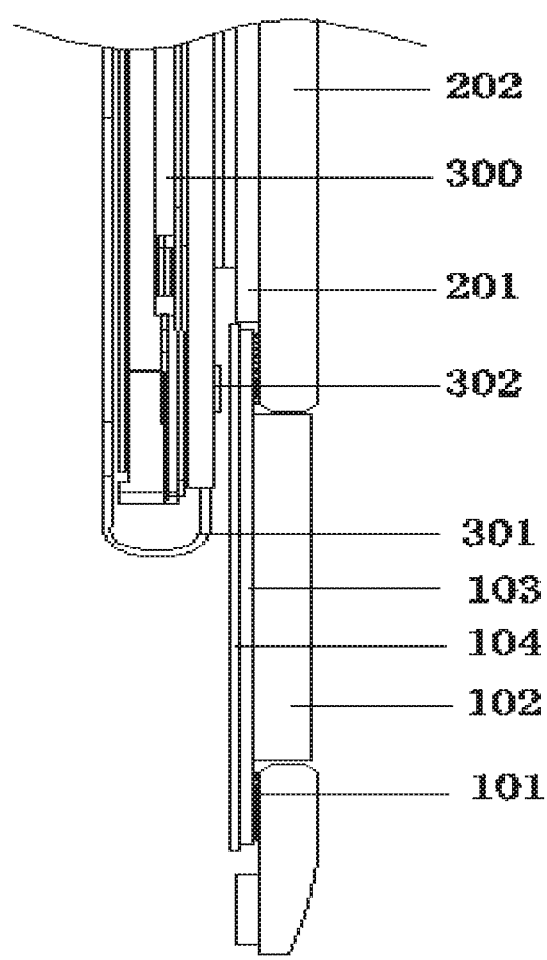
FIG. 2b is a partial side view of a fingerprint identification mobile phone according to one embodiment of the present disclosure.

As shown in FIG. 2b, the fingerprint identification module comprises the fingerprint identification decorative ring 101, the fingerprint identification module chip 102 configured to sense fingerprint information, and a fingerprint identification module circuit board 103 disposed under the fingerprint identification module chip 102 and configured to connect a fingerprint identification module circuit. Preferably, the fingerprint identification module further comprises a reinforcing steel sheet 104 disposed under the fingerprint identification module circuit board 103. The reinforcing steel sheet 104 and the fingerprint identification module circuit board 103 are bonded through glue. A strength of the fingerprint identification module can be enhanced, so that the fingerprint identification module is not easily deformed when subjected to force, thus improving the quality of the mobile phone and making the mobile phone more durable.

The fingerprint identification mobile phone according to the present disclosure comprises the above fingerprint identification module, and further comprises a display screen 300, a touch screen chip 201 disposed on the display screen 300 and configured to sense an external touch signal, a touch screen panel 202 disposed on the touch screen chip 201 and configured to protect the touch screen chip 201, and a display screen touch circuit board 301 and a display screen touch IC 302 are disposed at one end of the touch screen 300. The reserved hole for the fingerprint identification module is formed in the touch screen panel 202, and the fingerprint identification module chip 102 is disposed in the reserved hole for the fingerprint identification module. As a result, the fingerprint identification decorative ring 101 formed around the reserved hole for the fingerprint identification module is also around the fingerprint identification module chip 102 at the same time to achieve the visual effect of the fingerprint identification metal ring of a common fingerprint identification mobile phone. Preferably, the fingerprint identification module and the touch screen panel 202 are bonded through glue, so that the fingerprint identification module is more firmly attached to the touch screen panel 202, and is not easy to come loose when being used. The display screen 300 and a touch screen are completely adhered through glue and fixed to each other. A shape of the fingerprint identification module chip 102 corresponds to a shape of the reserved hole for the fingerprint identification module, and a width of the fingerprint identification module chip 102 is smaller than a width of the reserved hole for the fingerprint identification module. In this manner, when the fingerprint identification module chip 102 is pressed, for example, when the fingerprint identification module chip 102 is pressed as a homepage key, the fingerprint identification module chip 102 can have a sliding gap relative to the reserved hole for the fingerprint identification module, so the fingerprint identification module chip 102 is not caught and damaged.

A description is provided with reference to FIG. 2a and FIG. 2b. The fingerprint identification decorative ring 101 of the present disclosure is formed by screen printing, transferring or electroplating on the touch screen panel 202 to replace a metallic decorative ring 401 of a fingerprint identification module in a common fingerprint identification mobile phone. The metallic decorative ring 401 of the common fingerprint identification mobile phone has a greater volume and weight, and causes considerable burden regarding the length, width and weight of the entire mobile phone, so that the entire mobile phone is lengthened and made heavier. It is disadvantageous to the demand of the mobile phone market for the thin and light mobile phone, and cannot satisfy the pursuit of narrow bezel mobile phone by users. In addition, adding the metal part not only increases the material cost, but also a greater cost for manufacturing the metal part, which includes the expenses for stamping, grinding, lathe milling, polishing and subsequent packaging and transportation, etc. Hence, elimination of the metal ring not only reduces the length, width and weight of the mobile phone, but also significantly saves the processing cost. At the same time, the assembly processes and difficulty in the production process are reduced to improve the quality of the finished product.

With additional reference to FIG. 2a and FIG. 2b. The fingerprint identification decorative ring 101 of the present disclosure is formed by screen printing, transferring or electroplating on the touch screen panel 202, and is formed around the reserved hole for the fingerprint identification module of the touch screen panel to replace the metallic decorative ring 401 in the fingerprint identification module of the common fingerprint identification mobile phone. As a result, a hole diameter of the hole reserved for the fingerprint identification module in the touch screen panel 202 is decreased, thus reducing the length of the bezel of the mobile phone to satisfy the requirement of users for the narrow bezel mobile phone. The bottom bezel of the common fingerprint identification mobile phone is basically wide, but the fingerprint identification mobile phone of the present disclosure can be made to achieve the same width of the upper and lower bezels of the entire mobile phone and realize symmetry. In addition to that, decreasing the hole diameter of the hole reserved for the fingerprint identification module in the touch screen panel 202 not only makes the bezel of the mobile phone narrower, but also reduces the length of the entire mobile phone and shrinks the size of the entire mobile phone, which in turn brings convenience to a user and improves user experience.

As shown in FIG. 2b, one end of the display screen 300 of the mobile phone comprises the display screen touch circuit board 301 and the display screen touch IC 302. During the assembly process, if the display screen 300 of the mobile phone is placed right side up, that is, if one end of the display screen 300 of the mobile phone including the display screen touch circuit board 301 and the display screen touch IC 302 is placed near a top of the mobile phone, the one end of the display screen 300 of the mobile phone including the display screen touch circuit board 301 and the display screen touch IC 302 and a mobile phone camera will obstruct each other. In this manner, a greater length needs to be provided to an upper half region or top bezel of the mobile phone. If the display screen 300 of the mobile phone is placed upside down, that is, if the one end of the display screen 300 of the mobile phone including the display screen touch circuit board 301 and the display screen touch IC 302 is placed near a bottom of the mobile phone, the one end of the display screen 300 of the mobile phone including the display screen touch circuit board 301 and the display screen touch IC 302 and the fingerprint identification module will obstruct each other. In this manner, a greater length needs to be provided to a lower half region or bottom bezel of the mobile phone. In consideration of the above problem, when comparing the fingerprint identification mobile phone of the present disclosure in FIG. 2b with the common fingerprint identification mobile phone in FIG. 2a, the fingerprint identification decorative ring 101 of the fingerprint identification mobile phone according to the present disclosure is formed by screen printing, transferring or electroplating on the touch screen panel 202. Since the metallic decorative ring 401 in the fingerprint identification module of the common fingerprint identification mobile phone is not needed, the fingerprint identification module of the present disclosure is embedded underneath the touch screen panel 202, so that it can be made thinner under the circumstances that the thickness of the metal ring is reduced. A bottom portion of the thinned fingerprint identification module (that is, the fingerprint identification module circuit board 103 and reinforcing steel sheet 104) can be embedded in a gap between the display screen 300 and the touch screen panel 202. The lengths of the bezel of the mobile phone and the entire mobile phone are significantly reduced to further realize the requirement of narrow bezel mobile phone.

According to the embodiments of the present disclosure, a thickness of the fingerprint identification module chip 102 is preferably smaller than a thickness of the touch screen panel 202, so that the fingerprint identification module chip 102 is recessed relative to the touch screen panel 202 after the assembly is completed. If the mobile phone accidentally falls from height during usage, the touch screen panel 202 is in contact with the ground and the fingerprint identification module is not collided so as to protect the fingerprint identification module. A most reasonable width of the fingerprint identification decorative ring 101 is approximately one tenth of the width of the fingerprint identification module chip 102, and at the same time a better visual effect is also obtained.

Consequently, the present disclosure proposes a fingerprint identification decorative ring is formed around the reserved hole for the fingerprint identification module in the touch screen panel, and is formed by screen printing, transferring, or electroplating, on the touch screen panel. A fingerprint identification module comprises a fingerprint identification module chip configured to sense fingerprint information, and a fingerprint identification module circuit board disposed under the fingerprint identification module chip and configured to connect a fingerprint identification module circuit. The fingerprint identification module further comprises the fingerprint identification decorative ring disposed around the fingerprint identification module chip. Preferably, the fingerprint identification module further comprises a reinforcing steel sheet disposed under the fingerprint identification module circuit board and configured to enhance a strength of the fingerprint identification module. The present disclosure also proposes a fingerprint identification mobile phone comprising a display screen, a touch screen chip disposed on the display screen and configured to sense an external touch signal, and a touch screen panel disposed on the touch screen chip and configured to protect the touch screen chip. A display screen touch IC and a display screen touch circuit board are disposed at one end of the display screen. A reserved hole for a fingerprint identification module is formed in the touch screen panel. The fingerprint identification mobile phone further comprises the fingerprint identification module. A fingerprint identification decorative ring is further disposed on the touch screen panel, the fingerprint identification decorative ring is formed around the reserved hole for the fingerprint identification module in the touch screen panel. The fingerprint identification decorative ring is formed by screen printing, transferring or electroplating on the touch screen panel according to the present disclosure so as to replace the fingerprint identification metal ring. As a result, the hole diameter of the hole for the fingerprint identification module in the touch screen panel can be decreased, thus realizing the narrow bezel. At the same time, not only does elimination of the metal ring significantly reduce the thickness of the fingerprint module, but the circuit board and reinforcing steel sheet of the thinned fingerprint identification module can be embedded in a gap between the touch screen panel and the display screen to reduce the length of the entire mobile phone.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A fingerprint identification mobile phone comprising:
   a display screen;
   a touch screen chip, disposed on the display screen and configured to sense an external touch signal;
   a touch screen panel, disposed on the touch screen chip and configured to protect the touch screen chip;
   a fingerprint identification decorative ring, formed around a reserved hole of the touch screen panel;
   a display screen touch circuit board, disposed at one end of the display screen;
   a fingerprint identification module chip, disposed in the reserved hole and configured to sense fingerprint information; and
   a fingerprint identification module circuit board, disposed under the fingerprint identification module chip and configured to connect a fingerprint identification module circuit;
   wherein a shape of the fingerprint identification module chip matches a shape of the reserved hole, a width of the fingerprint identification module chip is smaller than a width of the reserved hole, and a thickness of the fingerprint identification module chip is smaller than a thickness of the touch screen panel;
   wherein the touch screen panel has a surface facing the fingerprint identification module circuit and the fingerprint identification decorative ring is formed only on the surface of the touch screen panel.

2. The fingerprint identification mobile phone as claimed in claim 1, wherein the fingerprint identification decorative ring is formed around the reserved hole, and is formed by screen printing on the touch screen panel.

3. The fingerprint identification mobile phone as claimed in claim 1, wherein the fingerprint identification decorative ring is formed around the reserved hole, and is formed by transferring on the touch screen panel.

4. The fingerprint identification mobile phone as claimed in claim 1, wherein the fingerprint identification decorative ring is formed around the reserved hole, and is formed by electroplating on the touch screen panel.

5. The fingerprint identification mobile phone as claimed in claim 1, wherein the fingerprint identification decorative ring is formed around the reserved hole, and is formed by etching on the touch screen panel.

6. The fingerprint identification mobile phone as claimed in claim 1, wherein the fingerprint identification decorative ring is formed around the reserved hole, and is formed by carving on the touch screen panel.

7. The fingerprint identification mobile phone as claimed in claim 1, wherein the fingerprint identification module further comprises a reinforcing steel sheet disposed under the fingerprint identification module circuit board and configured to enhance a strength of the fingerprint identification module.

8. The fingerprint identification mobile phone as claimed in claim 7, wherein a position where the fingerprint identification module is disposed at corresponds to the one end of the display screen where the display screen touch circuit board is disposed at.

9. The fingerprint identification mobile phone as claimed in claim 8, wherein the fingerprint identification module circuit board and the reinforcing steel sheet are embedded in a gap between the touch screen panel and the display screen.

10. The fingerprint identification mobile phone as claimed in claim 1, wherein the fingerprint identification module and the touch screen panel are bonded through glue.

11. The fingerprint identification mobile phone as claimed in claim 7, wherein the reinforcing steel sheet and the fingerprint identification module circuit board are bonded through glue.

12. The fingerprint identification mobile phone as claimed in claim 1, wherein the width of the fingerprint identification decorative ring is one tenth of the width of the fingerprint identification module chip.

13. A fingerprint identification module comprising:
a fingerprint identification module chip, configured to sense fingerprint information;
a fingerprint identification module circuit board, disposed under the fingerprint identification module chip and configured to connect a fingerprint identification module circuit; and
a fingerprint identification decorative ring, disposed around the fingerprint identification module chip and sandwiched between the fingerprint identification module circuit board and a touch screen panel.

14. The fingerprint identification module as claimed in claim 13, further comprising a reinforcing steel sheet disposed under the fingerprint identification module circuit board and configured to enhance a strength of the fingerprint identification module.

15. A fingerprint identification mobile phone comprising:
a display screen;
a touch screen chip, disposed on the display screen and configured to sense an external touch signal;
a touch screen panel, disposed on the touch screen chip and configured to protect the touch screen chip;
a fingerprint identification decorative ring, formed around a reserved hole of the touch screen panel;
a display screen touch integrated circuit (IC) and a display screen touch circuit board, disposed at one end of the display screen;
a fingerprint identification module chip, disposed in the reserved hole and configured to sense fingerprint information; and
a fingerprint identification module circuit board, disposed under the fingerprint identification module chip and configured to connect a fingerprint identification module circuit;
wherein the touch screen panel has a surface facing the fingerprint identification module circuit and the fingerprint identification decorative ring is formed only on the surface of the touch screen panel.

16. The fingerprint identification mobile phone as claimed in claim 15, wherein a position where the fingerprint identification module is disposed at corresponds to the one end of the display screen where the display screen touch IC and the display screen touch circuit board are disposed at.

17. The fingerprint identification mobile phone as claimed in claim 16, wherein the fingerprint identification module circuit board and the reinforcing steel sheet are embedded in a gap between the touch screen panel and the display screen.

18. The fingerprint identification mobile phone as claimed in claim 15, wherein a shape of the fingerprint identification module chip matches a shape of the reserved hole for the fingerprint identification module, and a width of the fingerprint identification module chip being smaller than a width of the reserved hole for the fingerprint identification module.

19. The fingerprint identification mobile phone as claimed in claim 15, wherein the fingerprint identification module and the touch screen panel are bonded through glue.

20. The fingerprint identification mobile phone as claimed in claim 15, wherein a thickness of the fingerprint identification module chip is smaller than a thickness of the touch screen panel.

* * * * *